Oct. 13, 1953　　　　C. V. EDWARDS　　　　2,654,982
CULTIVATING DEVICE
Filed Jan. 26, 1950

CURTIS V. EDWARDS,
INVENTOR.

BY Jesse P. Thann

ATTORNEY

Patented Oct. 13, 1953

2,654,982

UNITED STATES PATENT OFFICE 2,654,982

CULTIVATING DEVICE

Curtis V. Edwards, Yakima, Wash., assignor to Edwards Equipment Company, Yakima, Wash., a corporation of Washington Application January 26, 1950, Serial No. 140,579

5 Claims. (Cl. 55—61)

My invention relates to agricultural implements and relates in particular to a device of the general character of a cultivator used in preparation of soil. The implement not only loosens the soil so that air may enter and plant roots may readily extend therein, but also cuts and mixes into the soil plant food materials such as fertilizers, cover crops and the plant life remaining on the ground after harvesting.

It is an object of the invention to provide a simple and inexpensive device which not only cultivates the dirt but cuts grass, weeds, brush stubble and other organic materials, and mixes these materials with the soil so that they may be readily converted into valuable plant food by the chemical, bacterial and other action which takes place.

It is an object of the invention to provide an implement having a frame arranged to be moved along the surface of the ground by suitable motivating apparatus, such as a tractor, this frame carrying a plurality of movable blades which cut materials on the surface of the ground and also cut into the soil and by a characteristic rocking and twisting action loosen the soil, mix the same and also mix the cut organic materials with the soil.

A further object of the invention is to provide a cutting and cultivating device having novel means for supporting the cutter blades so that they may freely enter the soil, but also may do this without material vertical motion of the frame or without bumping action.

It is a further object of the invention to provide a device of this character having a plurality of blade assemblies, each blade assembly comprising radially outwardly projecting blades having transverse cutting edges, these blades being relatively widely separated in circumferential or circular spacing so that they may readily enter the ground. A feature of the invention is the mounting of the individual blade assemblies on hub bodies which are turnable on a shaft which is likewise turnable in bearing means supported by the frame.

A further object of the invention is to provide means for connecting the blade assemblies in pairs, with the blades of one assembly offset circumferentially from the blades of the other assembly of the pair, thereby disposing the blades for a rolling, cutting and digging action without bumping or pronounced vertical oscillation of the frame.

A further object of the invention is to provide the blades with cutting edges which are as wide as the hub sections on which they are mounted; and a further object of the invention is to provide these blades with helically disposed cutting edges.

A further object of the invention is to provide this device with a simple adjustable rilling attachment on the back portion of the frame, and a further object is to provide the frame with a simple laterally adjustable hitch.

A further object of the invention is to provide a device of the character disclosed herein having a plurality of transversely arranged groups of cutters revolving on axles or axes disposed in substantially horizontal planes but at slight angles to the forward line of movement of the device.

Further objects and advantages of the invention will be brought out in the following part of the specification wherein I have described a preferred form of the invention in detail, for the purpose of making a complete disclosure without limiting the scope of the invention set forth in the appended claims.

Referring to the drawing, which is for illustrative purposes only:

Figure 1:
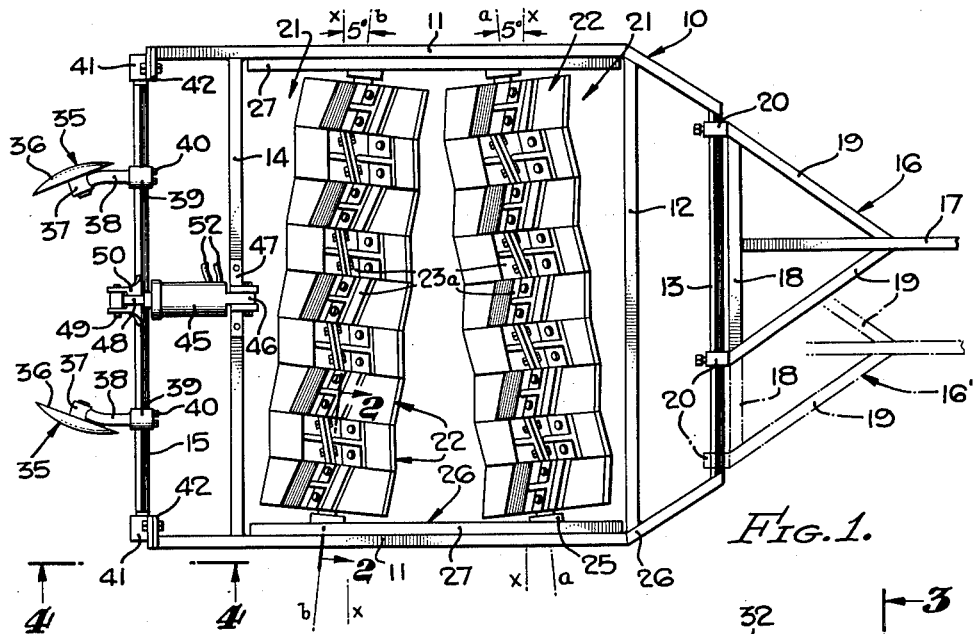
Fig. 1 is a plan view of a preferred form of my invention.

The agricultural implement comprising my invention has a frame 10 which may be readily fabricated from structural steel shapes, such for example as channels. The frame 10 has sides 11, transverse front bars 12 and 13, and transverse rear bars 14 and 15, connected to the sides 11 so as to form a frame of general rectangular form. A hitch 16, for connection of the device to a tractor, is connected to the front bar 13 so as to be adjusted laterally through selected positions, from the position in which the hitch 16 is shown in full lines to the position thereof indicated by dotted lines 16'. The hitch 16 comprises a forwardly projecting tongue 17 having a transverse bar 18 at its rear end, and diagonal reenforcing members 19 connecting the ends of the bar 18 with an intermediate portion of the tongue 17. The bar 18 is slidable along the bar 13, and the bar 18 has on the ends thereof clamps 20 which extend over the bar 13 to attach the hitch 16 to the bar 13 in selected positions of adjustment previously described herein.

In the frame 10 between the front and rear bars 12 and 14, rotary ground working elements 21 are supported so as to rotate respectively on horizontal axes a—a and b—b, these axes being disposed at slight angles, in opposite directions, to lines x—x which are perpendicular to the direction of movement of the frame 10 when the device is in operation. Each of the rotary elements 21 comprises a plurality of rotor assemblies 22, such as shown in detail in Figs. 2 and 3 wherein I have shown hubs mounted in side-by-side relation on a shaft 24 rotatably supported by grease-sealed bearings 25.

The bearings 25 are carried by a sub frame 26 comprising side bars 27 which are bolted to the inner faces of the sides 11 of the frame 10, making possible detachment of the sub frame 26 from 26 from the frame 10 so that the sub frame 26 and the rotary elements 21 may be reversed in the frame 10. That is to say, the sub frame 26 and the rotary elements 21 carried thereby may be rotated through an angle of 180° and reattached to the frame 10, so as to reverse the direction of rotation of rotary elements as sometimes found advisable in certain types or conditions of soils.

Each hub 23 has a plurality of radially extending walls 28 reenforced along their rear surfaces by ribs 29. By bolts 30 blades 31 are secured to the front faces of the walls 28, these blades 31 consisting of substantially flat plates of hardened steel sharpened so as to have beveled cutting edges 32 at their outer ends.

The number of blades on each hub 23 is relatively few so that adjacent blades on a single hub are spaced quite far apart. In the ordinary practice of the invention, each hub 23 may have from four to six blades 31 thereon. In the preferred embodiment of the invention disclosed herein I employ five blades 31 on each hub 23, and these blades 31 are disposed so that their cutting edges are in helical relation. That is to say, the cutting edges 32 are angled relative to the plane, perpendicular to the axis of the shaft 24 in which rotates the assembly of blades consisting of five blades 31 connected to a single hub 23. Although I have found that the angling of the blades 31 as described produces a good loosening and mixing of the soil with cut organic materials, good results may be obtained by supporting the blades 31 so that the cutting edges 32 thereof are in other relations to the axis of the shaft 24.

Figure 3:
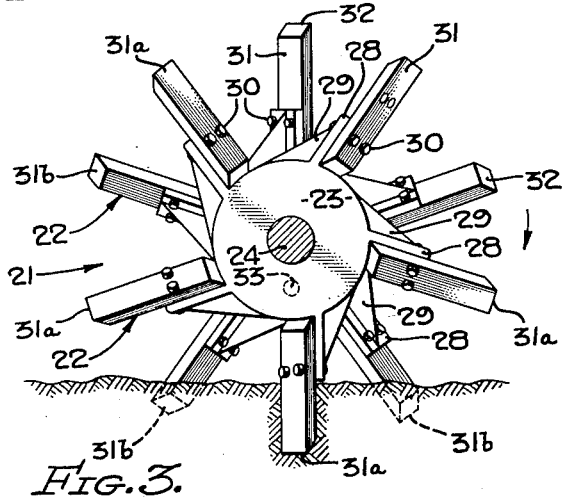
Fig. 3 is a face view taken from the plan indicated by the line 3—3 of Fig. 2.
Figure 2:
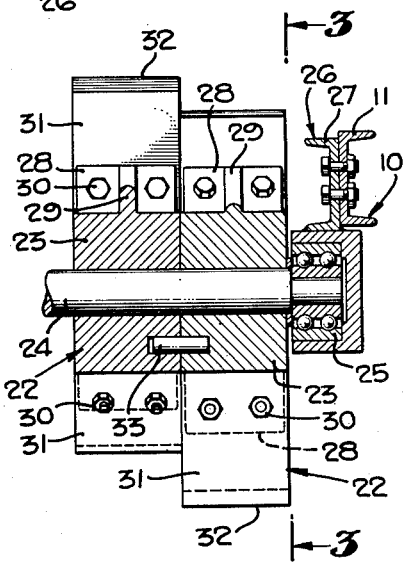
Fig. 2 is an enlarged fragmentary sectional view taken as indicated by the line 2—2 of Fig. 1.
Figure 4:
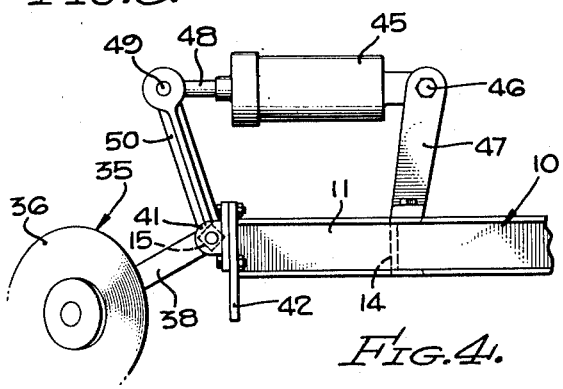
Fig. 4 is a fragmentary elevational view taken from the position indicated by the line 4—4 of Fig. 1.

In Figs. 2 and 3, I show a pair of hubs 23 in side-by-side relation, each of these hubs 23 having an assembly of blades 31 thereon. The two hubs 23 shown in Fig. 2 are connected together so as to act as a single hub body, and the hubs 23 are connected together so that the blades 31 of one blade assembly are offset from the blades of the assembly on the remaining hub 23. As shown in Fig. 3, the blades 31–a of one blade assembly are offset circularly from the blades 31–b of the blade assembly on the remaining hub 23. Although the hubs 23, or bodies each consisting of two hubs connected by pin 33, are rotatable on the shaft 34 which is in turn rotatable in bearings 25, it is impossible for the blades to become aligned so that a jumping action will occur when the device is pulled along by a tractor.

Referring to Fig. 3, it will be perceived that when the lowermost blade 31–a projects substantially vertically downwardly, the two adjacent blades 31–a are in a position wherein their cutting edges are contiguous to the ground surface. However, as viewed in Fig. 3, blades 31–b of the second assembly of blades lie between the radial planes defined by the blades 31–a. In the device described, the outer ends of the radial walls 28 define a cylinder having a diameter of 16 inches and the cutting edges of the blades 31–a and 31–b define a cylinder having a diameter of 24 inches. The blades therefore project 4 inches beyond the outer ends of the radial walls 28, but owing to the shape of the walls 38 and of the reenforcing ribs 29 the blades 31 may enter the soil to a depth of 6 to 8 inches. Each rotor assembly 22, comprising two assemblies of blades 31–a and 31–b, is rotatable independently of the rest of the rotor assemblies on the shaft 24 which rotates at a speed approximately that of the composition of rotor assemblies referred to as a rotary element 21 extending from side to side of the frame 10. But, as the shaft and the rotary element 21 rotate in unison, there may be a small adjusting rotation of the rotor elements 22 on the shaft and relative to each other in accordance with the soil conditions encountered by the respective blade assemblies. In the practice of the invention all of the hubs 23 need not be connected together in pairs. For example, I have shown several hubs 23–a on the shafts 24, which are rotatable independently of each other and of the remaining hubs on the shaft 24.

The bar 15 at the rear of the frame 10 is rotatable on its axis and is adapted to adjustably support one or more rilling tools 35. I have shown a pair of such rilling tools 35 as each consisting of a disc 36 supported by bearing means 37 carried at the swingable ends of arms 38 which have channelled bodies 39 at their upper ends to engage the bar 15, so that the rilling tools 35 may be adjusted along the bar 15 to desired positions of operation. Clamping screws 40 are provided for fixing the arms 38 in selected positions on the bar 15.

The ends of the bar 15 are carried by bearings 41 which are bolted to vertical plates 42 welded onto the rear ends of the side members 11 of the frame 10. The bearings 41 may be adjusted vertically on the plates 42 so as to raise or lower the bar 15 in order that the angle of engagement of the rilling tools with the soil may be changed to suit working conditions. Means are provided for swinging the rilling tools between raised and lowered positions. In the preferred practice of the invention such means consist of hydraulic cylinder 45 having the forward end thereof pivotally connected by hinge means 46 to the upper end of a bracket 47 mounted on the central portion of the cross bar 14. A piston rod 48 projects rearwardly from the cylinder 45 and is connected by hinge means 49 to the upper end of a lever 50 which is connected to the central portion of the bar 15 in upwardly projecting position. For operation of the cylinder 45 I show flexible conduits 52 extended therefrom. These conduits 52 may be connected to the hydraulic system of the tractor which pulls the device.

I claim:

1. In a cultivating device of the character described: a substantially horizontal frame member adapted to be moved along a path of movement; an axle supported by said frame in crossing relation to said path of movement; a plurality of pairs of hub sections rotatably supported on said axle in face to face relation; relative rotation preventing means interconnecting the hub sections of several pairs, each connected pair of hub sections being rotatable on said axle independently of the remaining pairs; and blades mounted on each of said hub sections in radially outwardly extending positions and with the cutting edges thereof in crossing relation to the planes in which said blades rotate, the blades on one hub section of each pair of hub sections being in staggered relation to the blades of the other hub section of the pair of hub sections.

2. A device as defined in claim 1 wherein the lengths of said blades is greater than the widths thereof, wherein the cutting edges of the blades are beveled along one side to form a sharp edge, and wherein said hub sections are reversible in said frame so that the blades will be thereby reversed and effect a different cutting action on the soil when the device is moved forwardly along the path of movement.

3. A device as defined in claim 1 wherein said hub sections have webs which extend outwardly, the rear faces of said webs being reinforced and the front faces of said webs have said blades bolted thereagainst.

4. A device as defined in claim 1 wherein said blades are sharpened by being all beveled in the same direction and wherein said horizontal frame member is provided with reversible connecting means for connection to said frame members in one position or in another position 180° therefrom, said reversible connecting means being adapted for connection to a tractor whereby said cultivating device may be selectively rolled across the soil in one direction or may, upon reversal of said reversible connecting means, be rolled across the soil in the opposite direction to give a different soil working action.

5. A cultivating device as defined in claim 1 wherein said frame member is connected to said axle by bearings which enable rotation of said axle.

CURTIS V. EDWARDS.

References Cited in the file of this patent

UNITED STATES PATENTS

| Number | Name | Date |
|---|---|---|
| 151,510 | Pitkin | June 2, 1874 |
| 1,585,839 | Ernst | May 25, 1926 |
| 1,782,593 | Zeilinger | Nov. 25, 1930 |
| 2,574,468 | Denton | Nov. 13, 1951 |

FOREIGN PATENTS

| Number | Country | Date |
|---|---|---|
| 71,995 | Switzerland | Mar. 16, 1916 |